Aug. 28, 1956

W. J. MAZE 2,760,686

SHAKER TYPE FERTILIZER DRILL ATTACHMENTS FOR
COMMERCIAL FERTILIZER DISTRIBUTORS

Filed Feb. 18, 1952

Inventor:
William J. Maze
By [signature]
his Attorney

Aug. 28, 1956
W. J. MAZE
2,760,686
SHAKER TYPE FERTILIZER DRILL ATTACHMENTS FOR
COMMERCIAL FERTILIZER DISTRIBUTORS
Filed Feb. 18, 1952
3 Sheets-Sheet 2
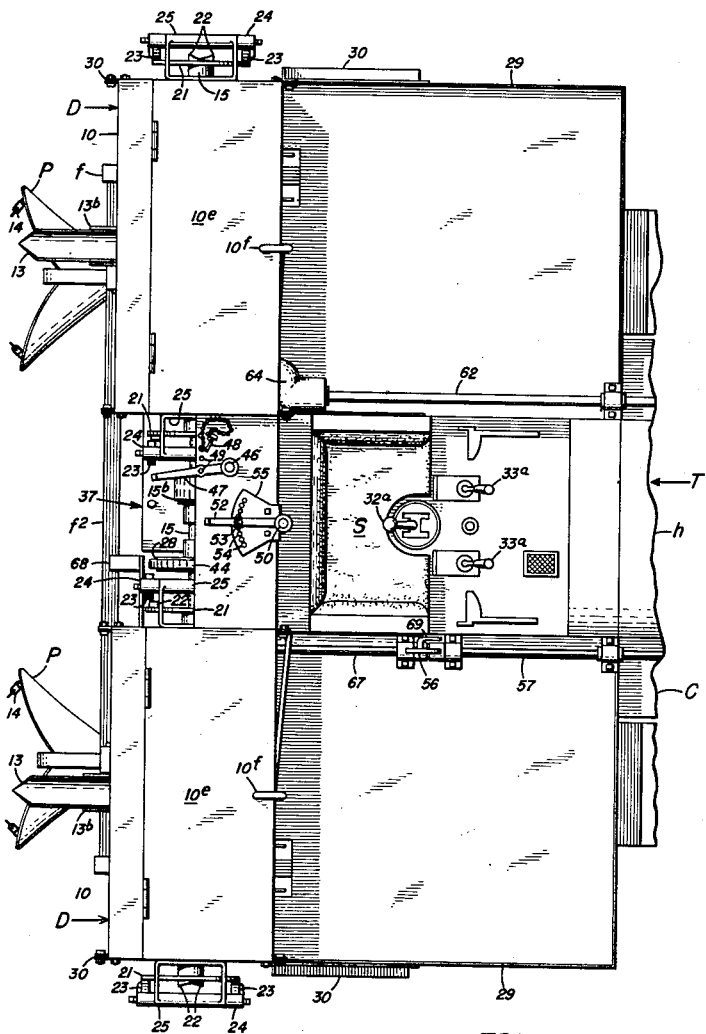
FIG. 2
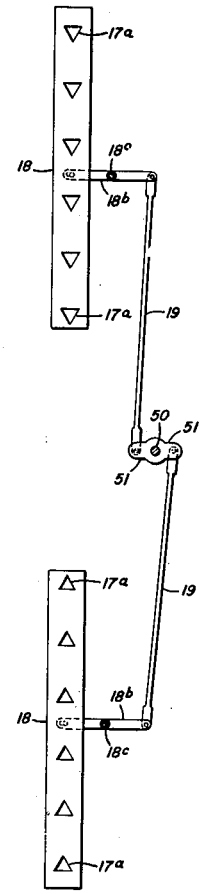
FIG. 8
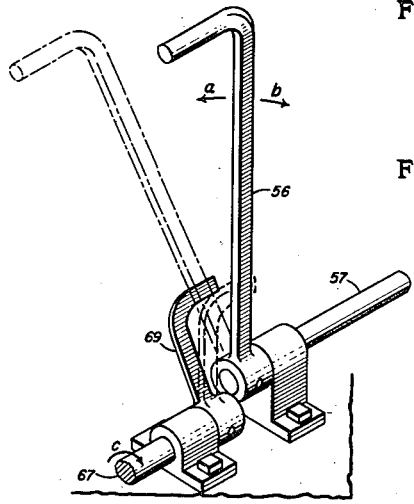
FIG. 9
Inventor:
William J. Maze
By 
his Attorney Aug. 28, 1956
W. J. MAZE
2,760,686
SHAKER TYPE FERTILIZER DRILL ATTACHMENTS FOR
COMMERCIAL FERTILIZER DISTRIBUTORS
Filed Feb. 18, 1952
3 Sheets—Sheet 3
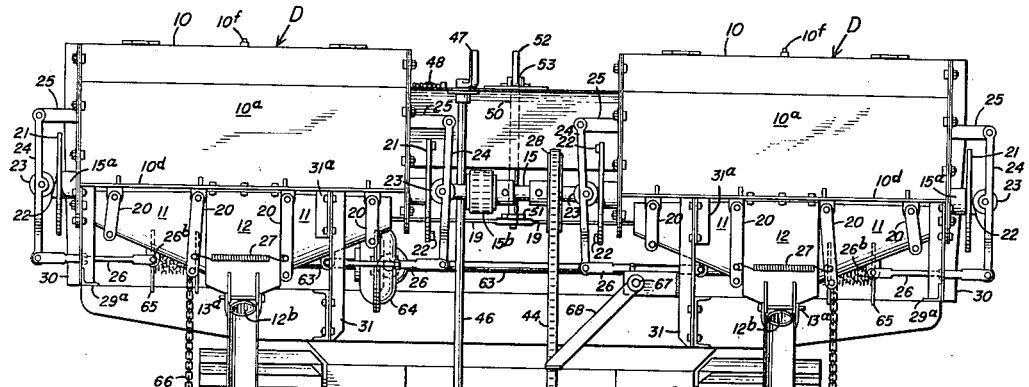
FIG. 4
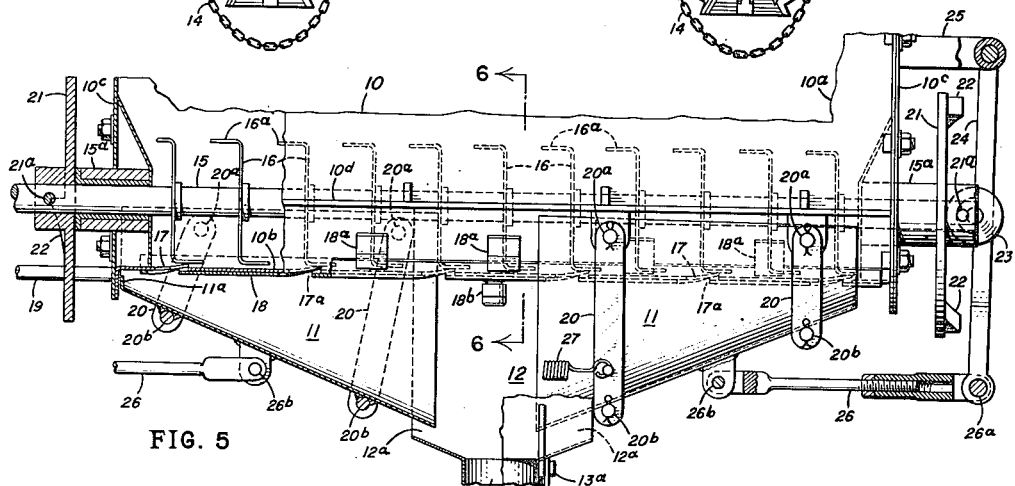
FIG. 5
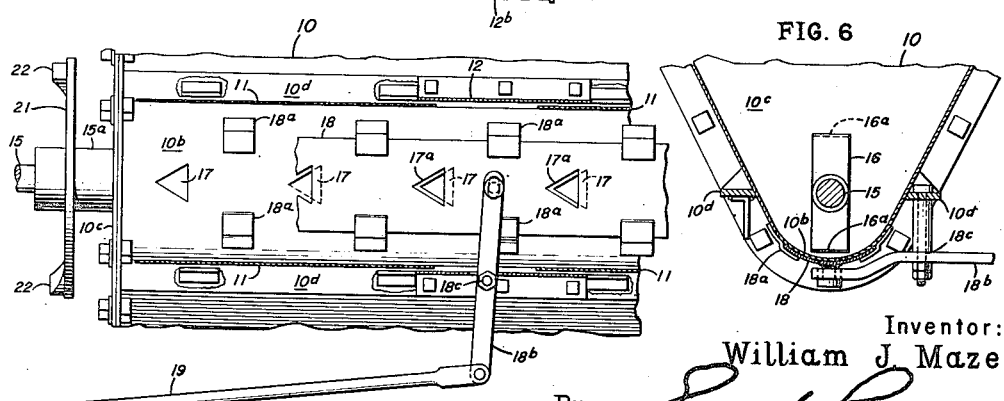
FIG. 6
FIG. 7
Inventor:
William J. Maze
By *[signature]*
his Attorney United States Patent Office 2,760,686
Patented Aug. 28, 1956

2,760,686

SHAKER TYPE FERTILIZER DRILL ATTACH-
MENTS FOR COMMERCIAL FERTILIZER
DISTRIBUTORS

William J. Maze, Honolulu, Territory of Hawaii

Application February 18, 1952, Serial No. 272,007

13 Claims. (Cl. 222—178)

The present invention relates to improvements in fertilizer distributors and more particularly to a fertilizer-drill attachment for such distributors.

In tropical areas, the application of, so-called, mixed fertilizers to the soil for the growing of crops has always been a serious problem, because (1) much larger quantities are applied per acre than in temperate climates, sugar-cane plants, for instance, requiring in one application as much as 2,000 pounds per acre; (2) mixed fertilizers—such as mixture of potash, nitrogen and phosphate or the like according to the requirements of any crop—are highly hydroscopic absorbing such amounts of moisture in humid tropical climates as to become sticky very quickly, thus preventing the fertilizer from flowing freely; (3) due to the latter and the large bulk involved, mechanical application of said fertilizer is extremely difficult, when known and ordinary commercial fertilizer distributors now available are employed, as any great amount of mechanical agitation of the fertilizer tends to compact the same, often jamming the mechanism, and (4) under trpical conditions, especially in areas having heavy rainfall, it is essential that the fertilizer be placed below the surface of the ground, preferably in the immediate area of the root of the plant. Hence, fertilizer distributors of the prior art have been unsatisfactory, in general, in meeting the problems presented in tropical areas and are wasteful of the fertilizer; and, while some of the more important problems have been mentioned above, there are many others.

Having in mind the deficiencies of the prior art, it is an object of this invention to overcome these drawbacks in fertilizer distributors and to provide a fertilizer distributor which is capable of handling large volumes of fertilizer material that flows freely in tropical climates without undue compacting and caking thus preventing jamming of the mechanism.

It is also an object of this invention to provide a fertilizer distributor, particularly for use in tropical climates, capable of delivering a large or heavy application of fertilizer, from a hopper or the like, in accurately metered quantities into a vibrating trough or troughs and which combines two features: (1) the trough means conveying the material to a discharge chute or spout that delivers the material to the bottom of a subsoil furrow in an even ribbon-like application and (2) imparting rapid vibratory action to the metering means, thus preventing the fertilizer material from sticking to the metering means and to the trough means.

A further object is to construct said fertilizer distributor so that it may be removably attached upon a tractor or other suitable self-propelled vehicle and, with slight change, if any, to the latter, may be actuated by the prime mover of the vehicle, in the forward movement of the latter, to deliver the fertilizer material proportionally to the speed of the vehicle in one or more streams into furrows made, by a suitable implement drawn by and operated from the vehicle, as the distributor progresses over the ground, said furrows being re-closed or filled with soil to cover the deposited fertilizer as the travel of the vehicle advances.

A still further object of the invention is to provide a novel means that transmits a vibratory motion to rotating wiper-feeding blades or feeders within the hopper to keep loose the fertilizer adjacent thereto and to keep the fertilizer from adhering thereto and that further imparts a rapid shaking movement to the conveying troughs positioned to receive the fertilizer dispensed from the hopper and to deliver it to the collector from which it is discharged, this shaking action preventing caking and packing of the fertilizer in the troughs and assisting in its passage or flow therethrough.

Moreover, it is an object and a necessity that the machine be simple mechanically for economy of construction and operation and be capable of instant control to permit proper distribution of the fertilizer and prevent waste thereof.

The foregoing objects, and others ancillary thereto that will appear as the specification proceeds, are accomplished in accordance with the present preferred embodiment of this invention wherein there is provided a hopper having an elongated rounded bottom or sump with openings therein (preferably diamond-shaped) and having therein, overlying said openings, a plurality of spaced fingers or blades carried on and rotating with a distributor shaft projecting through the end walls of said hopper; the ends of said shaft each carrying a cam surface engaging a cam-follower mounted on a lever connected to an inclined trough underlying the bottom of said hopper and discharging into a chute that collects said fertilizer and delivers it to the ground in a stream. The trough is preferably in two sections which are alternately reciprocated or oscillated by said cams which transmit a vibrating movement to said blades or fingers; the hopper being removably mountable upon a suitable vehicle and the said distributor shaft being adapted to be driven therefrom. The vehicle is preferably equipped with a furrow producing means and a furrow closing means between which the discharge end of the said chute is interposed to deliver the fertilizer into said furrow, said means being movable into and out of operative position which movement correspondingly moves said chute.

The invention itself, however, both as to its organization and its method of operation, together with additional objects and advantages thereof, will best be understood from the following description of a specific embodiment, when read in connection with the accompanying drawings wherein like reference characters indicate like parts throughout, and in which:

Figure 2 is a plan view of Figure 1;

Figure 4 is a rear view of the mechanism shown in Figure 1;

Figure 5 is an enlarged fragmentary elevational view of the lower end of the dispensing hopper equipped with the collecting trough and with parts broken away to show details;

Figure 6 is a vertical sectional view of the lower end of the hopper and is taken substantially on line 6—6 of Figure 5;

Figure 7 is a bottom or under view of the hopper shown in Figure 6;

Figure 8 is a diagrammatic plan view to illustrate the operating linkage between the shutter slides of two adjacent hoppers; and Figure 9 is a fragmentary enlarged perspective view of a safety "throw-off," shown in Figures 1, 2 and 3, for moving to neutral position the hand control lever of the implement draw-frame raising and lowering means when said frame has been raised sufficiently.

Figure 1:
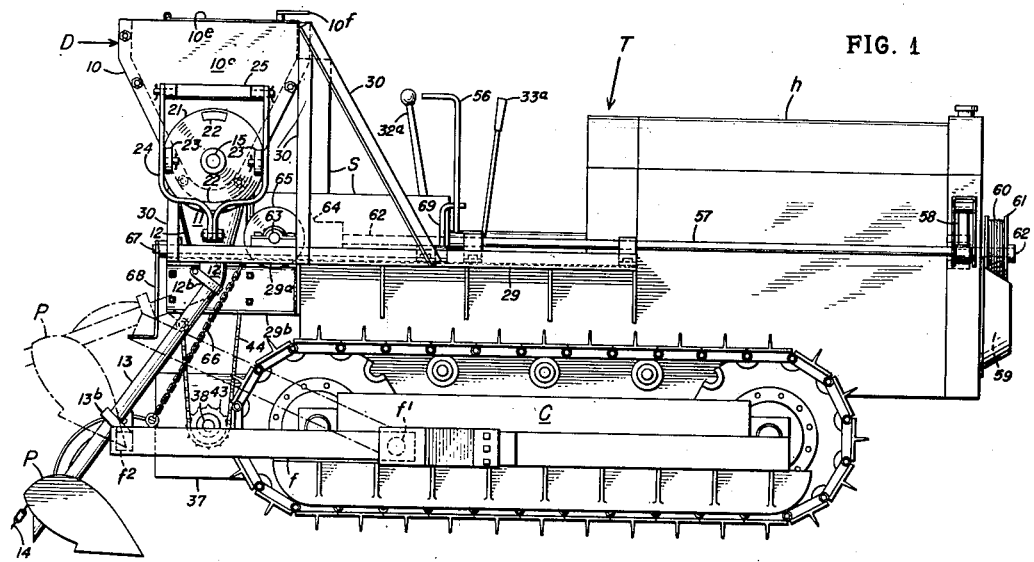
Figure 1 is a side elevation of a conventional crawler-type tractor equipped with the fertilizer distributor of the present invention.

As shown particularly in Figures 1, 2 and 4, the fertilizer distributor means D, according to this invention, is mounted upon a suitable vehicle T, preferably of the self-propelled type, such as a tractor, having a prime-mover or engine (not shown) under the hood $h$ and is so positioned thereon as to be at an elevation high enough to allow the fertilizer, dispensed from the bottom of a bulk-containing hopper 10 in a plurality of granular streams, to be collected by a trough means 11 and conveyed thereby, by gravity, to one or more central points or collecting boots 12 from each of which the fertilizer material is discharged in a single stream, the said troughs being reciprocable or oscillatable to produce a shaking motion which prevents the fertilizer material from sticking to the walls of the troughs and which motion assists the fertilizer to gravitate to said point of discharge.

The tractor T, to which the fertilizer distributor of this invention is preferably applied, is of the caterpillar or crawler type, as shown, and is equipped with an implement frame $f$, generally U-shaped in form, having its free ends pivotally mounted, as at $f'$, to opposite sides respectively of the chassis C of the tractor and its closed end $f^2$ forming a draw-bar to which implements may be attached, such as plows P or the like. Since it is one of the objects of this invention to mount the fertilizer distributor to deliver a stream of fertilizer to a furrow made by a plow P or like implement, the distributor means D is preferably mounted across the rear of the tractor and inclined chutes 13 convey the fertilizer material from the discharge points 12 to a point behind the plow P into the furrow made by the latter. Means 14, which may be drag-chains having their ends secured at spaced points to each plow to form drag-loops following behind along the furrows of the plows, move loosened soil to cover the fertilizer that has been deposited into the furrow or furrows.

The fertilizer distributor D, itself, comprises a rectangular hopper 10, the long dimensions of which being considerably elongated and the overall dimensions of the hopper being such as to contain a large quantity of fertilizer to reduce, as far as practical, the necessity for too frequent replenishment. The hopper is replenished through its top which is equipped with a hinged cover $10^e$ to exclude water and dampness from its contents, the cover having a handle $10^f$. The lower portion of the hopper, preferably, has its side walls $10^a$ converging and forming a rounded bottom or sump $10^b$ for the hopper as particularly shown in Figure 6. Disposed within the hopper 10 and extending longitudinally of its rounded bottom $10^b$ is a shaft 15 having its ends journalled as at $15^a$, in the end walls $10^c$ of the hopper, the shaft 15 being positioned, preferably, about 4 or 5 inches from the bottom wall $10^b$ of the hopper. The shaft has mounted thereon, to rotate therewith, a plurality of feeding blades or fingers 16 spaced about 6 inches apart therealong. These blades or fingers 16 are of a type to force the fertilizer out of openings 17, preferably triangular shape, as shown, and equi-spaced along the bottom wall $10^b$ of the hopper, and to break up lumps of fertilizer material, but are not designed to compress the fertilizer material, which, as above stated, would cause sticky or moistened fertilizer to compact.

To this end, the blades 16 may each comprise a strip of metal having a center opening therein through which the shaft 15 extends and to which shaft the blade is made fast to rotate therewith, their opposite ends projecting from the shaft radially for a distance so that, when the shaft is rotated, the opposite ends of the blades will be within a fraction of an inch of the inner surface of the bottom wall $10^b$ of the hopper. Each extremity of said blade 16 is formed with a laterally extending portion forming a finger $16^a$, the finger at one end of the blade extending oppositely with respect to the finger at its other end, and the blades preferably being in alignment. Thus, the fertilizer within the hopper falling or gravitating toward the blades is cut by the edges of said blades and fingers during their rotation and lumps thereof are broken and forced by the fingers $16^a$ through the underlying openings 17 in the bottom of the hopper. This assures against too violent agitation and compression of the fertilizer and, further, assures that the fertilizer will be in a substantially granular condition when fed from the hopper.

Underlying and conforming with the contour of the bottom wall or sump $10^b$ of the hopper is an elongated slide-plate shutter 18 held in contiguous position against the undersurface of said bottom wall by guide clips $18^a$ secured to the latter. The plate has openings $17^a$ corresponding in shape and size to the shape of the openings 17 in said bottom of the hopper and correspondingly spaced so as to register with the openings 17 in one of the positions of the elongated shutter 18, the shutter having a sufficient longitudinal reciprocable movement with respect to the bottom of the hopper to bring said openings into alignment to allow unrestricted passage as well as to move the openings out of complete alignment so that the passage of the fertilizer material from the hopper may be discontinued. Intermediate relative positions of said openings variously regulate the amount of flow of the fertilizer therethrough, as is well understood. The shutter 18 is operated by a lever $18^b$ pivoted intermediately to a portion of the hopper 10, as at $18^c$, and having one end pivoted to the shutter 18 and having its other end connected to a rod 19 that extends to a suitable operating means (see Figures 4, 5, 6 and 7).

Disposed under and spaced from the hopper 10, and extending longitudinally with the bottom or sump $10^b$ thereof, is an inclined trough means mounted to be reciprocated to produce shaking motion. This trough means, preferably, comprises two trough sections 11, each underlying an end portion of the hopper 10 and each declining from its outer end portion toward the center of the hopper where its inner end extends info an opening $12^a$ of a boot 12 rigidly fastened to horizontal flanges or bars $10^d$ on and extending along the side walls of the hopper. The boot 12 has its toe portion provided with an opening $12^b$ discharging into the chute 13 having its upper end pivoted at $13^a$ to the underside of the toe of said boot.

The trough sections 11 are of generous proportions, as shown, and are formed with rounded inclined bottoms and with upwardly extending side walls that closely embrace the lower part of the hopper well above its bottom wall $10^b$ and closely underlie the outwardly projecting flange $10^d$, the outer ends of the bottom of the trough section being disposed closely adjacent to a depending portion of the end walls $10^c$ of the hopper and each having an upwardly projecting lip $11^a$ (Fig. 5) extending substantially to the bottom wall $10^b$ of the hopper— all to avoid spilling or wastage of the fertilizer as well as to exclude, as much as possible, atmospheric moisture from the fertilizer. The trough sections 11 are supported in this position by hangers 20 suspended from opposite sides of the hopper 10 and are, preferably, in the form of substantially vertically disposed links having their upper ends pivoted, as at $20^a$, to the flange $10^d$ and their lower ends pivoted to pintles, as at $20^b$, carried by the trough sections 11. The links at the inner end portions of the adjacent sections 11 are connected by a tension spring 27 so as to yieldably hold said sections in normal position with a bias toward each other, the movement of said connected links being limited in this biased movement by suitable stops, such as engagement with the adjacent parts of said boot 12.

The degree of declination of the bottoms of the trough sections 11 may vary between 10° and 22° from the horizontal, it having been found advisable to employ the latter degree of declination where the fertilizer distributors are operated on hill sides.

In order to impart the shaking motion to the trough means 11, the shaft 15 projects outwardly beyond the ends of the hopper 10 and has mounted on each end thereof a cam means having an operative connection with the trough means 11 to reciprocate the latter longitudinally as the shaft rotates. The cam means at each end of the hopper 10, preferably, takes the form of cam discs 21 having a hub surrounding and keyed, as at 21a, to the shaft 15 and has on one of its faces, preferably its outer side face, wedge-shaped cam lugs 22 disposed concentrically about the peripheral marginal edge portion of the disc. A cam-follower is provided to cooperate with the cam lugs 22 on said disc 21 and comprises a yoke-type frame member 24 having its spaced opposite yoke-arms suspended from and pivoted to a suitable bracket 25 secured to the adjacent end wall 10c of the hopper 10, each of the yoke-arms having journalled thereon a cam-follower roller 23. The yoke-arms are sufficiently spaced to position said rollers 23 diametrically opposite relative to said disc and within the path of movement of the cam lugs 22 so as to be simultaneously and intermittently engaged by the diametrically positioned lugs 22 on the disc 21 when the latter is rotated. An adjustable link 26 pivotally connects the lower stem of the yoke 24 to an underside of the adjacent trough section 11, as indicated at 26a and 26b. The wedge-shaped cam lugs 22 are positioned on their discs 21 so that their thin edge will lead, when the discs are rotated by the forward travel of the distributor or of the vehicle upon which it is mounted, and thereby, the lugs first engage the cam rollers and force the yoke 24 outwardly against the tension spring 27 from the position shown in the drawings, bringing with it its trough section 11, and, then, by reason of the tension of the spring 27, as the rollers ride off the thick end of the lugs 22, the roller 23 snaps back against the face of the cam disc 21 and the trough sections move back to their position shown in full line of the drawing, thus producing a reciprocating shaking motion to the trough section so actuated. It will be observed that it is preferred to arrange the cam lugs 22 on each disc, at opposite ends of the hopper 10, so that only one pair of such cam lugs 22 will operate at one time; in other words, when the lugs on one cam disc 21 are effectively operating its cam follower, the lugs on the other cam disc 21 do not operate, thus positively actuating said two trough sections 11 alternately. The butt or thick ends of the lugs 22 should be about 5/8 of an inch thick and it has been found that in most cases one pair of diametrically disposed cam lugs 22 are sufficient for each disc 21 to give the proper shaking movement sought, although additional pairs may be employed.

The alternate action of the rollers 23, riding off the lugs 22 and being snapped by springs 27 against the face of their discs 21, causes a vibratory movement to be transmitted to the hopper 10 and through the shaft 15 to the blades 16 and their fingers 16a. These vibrations assist in causing the fertilizer material to gravitate to the blades and assist the blade in feeding the material through the dispensing openings 17 and 17a.

It is within the purview and contemplation of this invention that one distributor D, as above described, may be employed on a suitable vehicle—that is, one large hopper 10 may be employed that extends transversely across the vehicle purposely, at the back thereof, and it may have one or more trough means 11 disposed thereunder or, as shown particularly in Figures 2 and 4, there may be employed two independent distributor means D. In this latter arrangement the two distributors D are disposed in end-to-end alignment at the rear of a crawler-tractor T and the adjacent aligned ends of the shafts 15 thereof are connected by a coupling 15b, preferably of the flexible roller-chain type, and one of the shafts 15 is provided with a sprocket wheel 28 fast thereon. Otherwise each distributor is constructed the same as above described.

Should the side frame members 29 of the platform of the tractor T not extend sufficiently rearwardly to provide support for the distributors D, these side members 29 are provided with extensions 29a from which upwardly extend stanchions 30 to support the outer end portions of the hoppers 10, the inner end portions of the hopper being supported by upwardly extending brackets 31 secured to the rear transverse bolsters of the tractor and which have arms extending upwardly to have the flange or bar 10d of the hoppers rest thereupon and to be removably secured to bracket arms 31a carried by said hopper, as shown particularly in Figs. 1 and 4.

Figure 3:
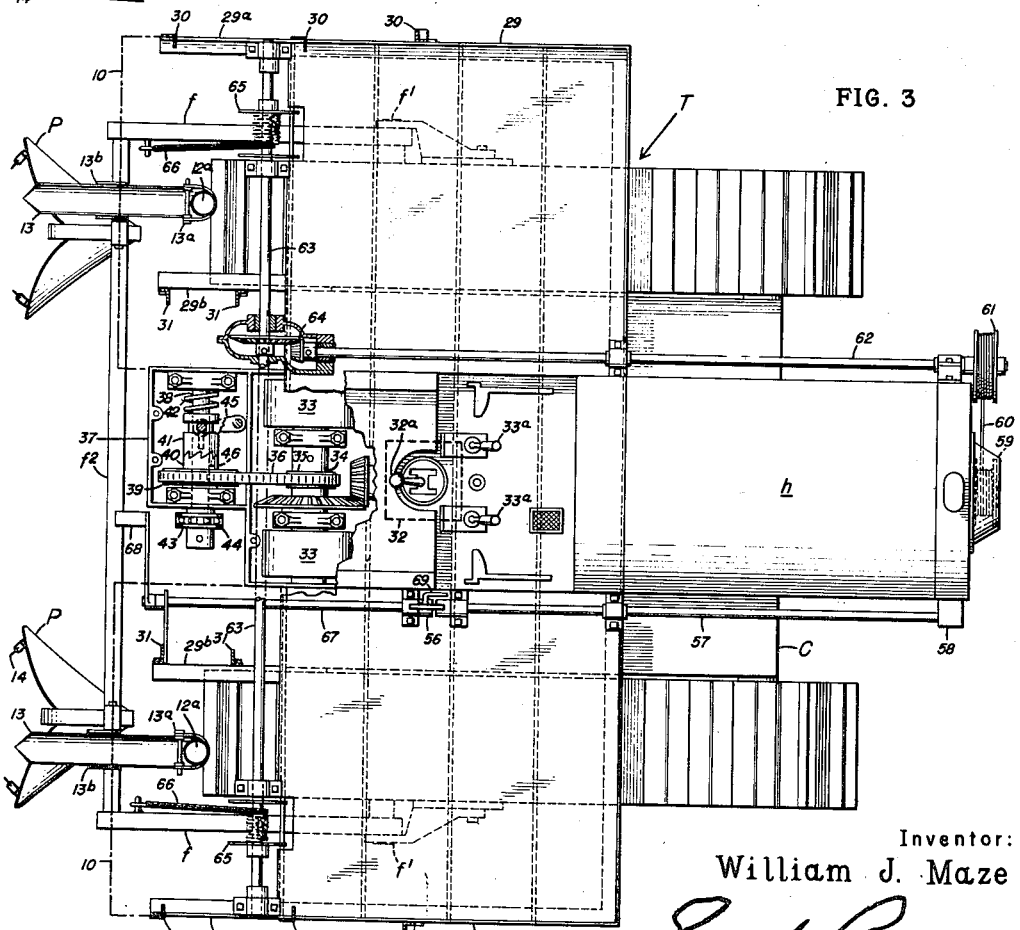
Figure 3 is a top-plan view of the tractor shown in Figure 1, but with part of the fertilizer distributor removed and part broken away, to illustrate details, construction and certain alterations and additions that may be made to actuate said distributor from the drive-means of the tractor.

The shaft 15 of one of the distributors is to be driven from the prime mover of the tractor T and this power must be taken off at a point behind or, in other words, at the "out-put" side of the change-speed transmission gearing 32 so that the revolutions of the shaft 15 will be synchronized with the forward speed of the tractor because otherwise a different rate of fertilizer application would result each time the variable speed transmission 32 (see Figure 3) is changed by the transmission lever 32a. In crawler type tractors, the movement of each caterpillar tread is controlled through a clutching mechanism 33 interposed between its caterpillar tread and the ends of a power takeoff shaft 34 which receives its motion from the variable speed transmission 32. These clutching mechanisms are usually operated, respectively, by hand-levers 33a. Consequently, to operate the shaft 15 of one or more distributors D, as herein shown, a sprocket gear 35 is mounted fast upon the shaft 34, or its equivalent, between said two caterpillar-tread controlling clutching mechanisms 33 and is connected by a chain 36 to a clutch unit 37, or its equivalent, that is applied to the chassis of the tractor immediately behind the shaft 34 and, preferably, under the shaft 15 of the distributors.

This clutch unit 37 is preferably of the one-way type and may comprise a rotatable shaft 38 having a roller-chain gear or sprocket 39 rotatable thereon, the hub of which gear 39 has a toothed-face clutch member 40 cooperatively disposed with respect to a toothed clutch collar 41 splined on the shaft 38 and biased to normally engage the clutch member 40 on the gear 39 by a compression spring 42. One end of the shaft 38 extends exteriorly of the housing of the clutch unit 37 and has fast thereon a sprocket wheel 43.

A sprocket chain 44 is trained over and connects the sprocket wheels 28 and 43 whereby the distributor shaft 15 may be rotated with the forward movement of the vehicle to cause rotation of the feed blades 16 and of the cam mechanism 21—24 for the purposes previously described. The teeth of the clutch members 40 and 41 of the clutch unit 37 are so designed or beveled as to remain in engaged driving engagement while the vehicle is being driven forwardly but will slip over each other should the vehicle be driven backwardly, as when in reverse drive, thus discontinuing the drive to the shaft or shafts 15 of the distributors. A throw-out arm 45 is disposed in the housing of the clutch unit 37 and is fast on a shaft 46 suitably journalled in said housing and extending to a convenient location for operation by the operator through a crank-handle 47 to disengage the clutch members 40 and 41 (see Figs. 2, 3 and 4). The throwout arm 45 may have a yoke end riding in a groove in the splined clutch collar 41, as shown, and by rotating the shaft 46 clockwise by said crank handle 47, the clutch member 41 may be shifted on shaft 38 out of engagement with its cooperating clutch member 40 so that no driving motion will be imparted to the shaft 15 whether the vehicle is proceeding forwardly or in reverse. The handle member 47 may be held or locked in its clutch disengaging position by any suitable means, such as a lock-pin 48 receivable in registrable openings 49, one carried in the handle by itself and the other in a fixed portion of the vehicle.

It will be obvious that the ratios of the sprockets 35, 39 and 28 will vary depending upon the vehicle or tractor upon which the distributors D are mounted; however, in general the ratio should be computed to give twenty-two revolutions a minute for the distributor shaft 15, when the tractor is running at a speed of about one and seven-eighths to two miles an hour in low gear, in order to obtain what is regarded as the optimum feed of fertilizer from the hoppers 10 for the purposes for which this distributor is primarily devised. However, changes in the speed of the shaft 15 can be varied as found desirable or necessary for any given operation desired.

When two independent distributors are employed on one vehicle, as shown in Figures 2 and 4 hereof, it is desirable that both of the slide shutters 18 of each hopper 10 be operated in unison so that the supply of fertilizer from each hopper will be approximately the same. Consequently, a linkage arrangement is shown in Figure 8 for accomplishing this purpose by one operating handle member; and, to this end, a vertical rotatable shaft 50 is suitably journalled in the fixed part of the vehicle and has fast upon its lower end radially extending arms 51 to which the links 19, extending from said shutters 18, are pivotally connected, respectively, the other end of said shaft 50 being positioned within easy reach of the operator and equipped with a crank handle 52 by which the shaft 50 may be rotated in either direction sufficiently to impart a sliding motion, through the links 19 and 18$^b$, to these slide shutters 18 in order to control the flow of fertilizer to the openings 17 and 17$^a$, shown more clearly in Figure 7. The adjusted position of the handle 52 may be maintained by a suitable lock or latch means, such as, for instance, a detent 53 yieldably engageable in one of a series of holes or depressions 54 in a segmental plate 55 disposed under and adjacent to said handle 52.

The invention contemplates that the implements P and the chutes 13 be capable of being elevated from and lowered to their operative positions, as occasion may require. In the tractors of the type herein shown, they are usually equipped with a hoisting drum actuated from their primer-mover and controlled by a hand-lever positioned within reach of the operator of the vehicle. Such a hand-lever 56, when moved in the direction of arrow $a$ in Figure 9 from its normal full-line position to the dotted position, rotates the shaft 57 extending from the seat S of the driver to a forward part of the tractor where, through a suitable coupling mechanism 58, a spool 59 is caused to be driven, in at least one direction, to wind thereon a cable 60 from a spool 61 fast on a shaft 62 extending from the forward end of the tractor rearwardly to a winding shaft 63 extending transversely across the end of the vehicle. The shaft 63 receives its motion from the shaft 62 through a bevel gear unit 64 and each end of the shaft 63 carries a drum 65 upon which is wound a hoisting chain 66 connected to the implement frame $f$ so that the implement bar $f^2$ may be raised and lowered to move the implements P into and out of the effective operative position, as shown in Figure 1.

When the frame $f$ is in an elevated position and the hand-lever 56 is moved to normal or neutral full-line position in the direction of arrow $b$ in Figure 9, the implement frame $f$ will move downward under its own weight until the hand-lever 56 is again brought to its neutral or normal position, which causes the coupling mechanism 58 to lock or hold the movement of the spool 59, thus maintaining the frame $f$ at a desired position. Said downward movements of the frame $f$ cause a reverse direction of rotation of shafts 63 and 62 and a rewinding of the cable 60 upon the spool 61 from the spool 59.

It will be observed that the lower end portion of each chute 13 rests in a stirrup 13$^b$ on the implement bar $f^2$ and are, therefore, movable about their pivots 13$^a$, when the implement frame $f$ is raised or lowered.

In order that the implement frame $f$ may not be raised too high as to injure the distributors D before the operator takes cognizance of the possibility, a means is provided to automatically discontinue the operation of the hoisting winding spool 59 when the implement frame $f$ has reached a desired elevation. To this end, a horizontal shaft 67 is journalled on the body of the tractor and extends rearwardly for a distance from a point adjacent the rear end of the shaft 57 so that its rear end, which has fast thereon a radially projecting and downwardly inclined trip lever 68, will position said lever 68 so as to be engageable by the implement bar $f^2$, when said bar has reached a desired elevation, and will move trip arm upwardly rotating said shaft 67 in the direction of the arrow $c$, shown in Figure 9, so as to bring a sticker-arm 69, on the other end of said shaft, into engagement with the hoisting control hand-lever 56 and forcibly move it from its dotted-line position back to a neutral position. This operation causes the shaft 57 to actuate the coupling mechanism 58 to discontinue the hoisting rotation of the winding spool 59 and maintain said frame $f$ in its raised position. When the frame $f$ is allowed to be lowered, as above explained, the weight of the trip arm 68 will rotate the shaft 67 in a counter direction to the arrow $c$, shown in Figure 9, and, as a consequence, the sticker-arm 69 will be returned to its full line position shown in Figure 9.

The fertilizer distributor described above meets and fulfills the objects set forth above and in practice has been found to be efficient and economical in operation. Having thus described the invention and the manner in which the same is to be performed, it is to be understood that the invention is not to be limited to the exact detail, construction and arrangement herein described because the same may be varied or modified in various ways that follow within the scope of the appended claims.

That which is claimed, as new, is:

1. A fertilizer distributor adapted to be mounted upon a vehicle and comprising a hopper having an elongated bottom provided with a series of discharge openings in and along the length of said bottom, a rotatably journalled shaft adapted for driving connection from the running-gear of the vehicle and disposed within the hopper and extending longitudinally of said bottom thereof and beyond the end walls thereof, blades on the shaft for feeding contents on said hopper through said openings, a collecting boot disposed below and in spaced relation with a central portion of the bottom of said hopper and suspended from the hopper to embrace the sade walls thereof, said boot having a discharge opening in its lower end portion, trough sections disposed below and in spaced relation with said bottom of said hopper and swingably suspended from the latter, one of said sections extending, respectively, from each end of said hopper into said boot, said trough sections having their bottom walls declining from their outer end toward said boot, yieldable means normally biasing said trough sections to move toward each other, a chute mounted at the lower end of said boot to receive the material collected by said trough means and conveyed to said boot, and a disc-like face on each end of said shaft and rotatable therewith and having spaced wedge shaped cam surfaces thereon with their tapered ends arranged in one direction of rotation of the shaft, a cam follower mounted for cooperative engagement with each of said disc-like faces and its cam means, and a linkage connecting said follower to said trough means and imparting a shaking motion to said trough means longitudinally thereof and a vibrating motion to said blades when said shaft is rotated.

2. In a distributor for fertilizer and the like, an elongated hopper having controllable discharge means along its bottom wall including a feeding-means for discharging the contents of the hopper through said bottom wall, a rotatable shaft for actuating said feeding-means, inclined trough means disposed below and spaced from the bottom wall of said hopper, hangers pivotally suspending said trough-means in position, a vibratory camming means on an end of said shaft exteriorly of said hopper and including a cam follower therefor mounted in cooperative relation therewith, a linkage connecting said cam follower with said trough means and disposed to impart a longitudinal shaking movement to said trough means and a vibrating action to said feeding-means, and means holding said cam follower in contact with its cam means.

3. In a distributor for fertilizer and the like, an elongated hopper having controllable discharge means along its bottom wall including a feeding-means for discharging the contents of the hopper through said bottom wall, a rotatable shaft extending along the bottom of said hopper and having said feeding means mounted thereon and rotated thereby, a pair of trough sections disposed along and below the bottom wall of said hopper in spaced relation thereto, hangers pivotally suspending said trough-sections from said hopper in position with their bottom surfaces declining toward each other to a point of discharge, a disc fast on each end of said shaft exteriorly of said hopper and wedge-cam surfaces diametrically positioned thereon, the cam surfaces on one disc being angularly spaced with respect to the cam-surfaces on the other disc, a cam follower for each disc and swingably mounted on said hopper in cooperative relation to said cam-surfaces, a linkage connecting said cam followers with their adjacent trough section, and biasing means normally holding said followers in contact with said discs and causing said trough sections to move toward each other.

4. A distributor as set-forth in claim 3, wherein there is a collecting boot at the meeting declining ends of said trough-sections and into which said trough-sections discharge, said boot having a discharge opening in the lower portion thereof.

5. In a distributor for fertilizer and the like, an elongated hopper having discharge openings along its bottom wall for the passage of the contents of the hopper, feeding blade means within the bottom of said hopper and mounted upon a rotatable shaft, a collecting boot disposed below and in spaced relation with a central portion of said bottom wall of said hopper and fixedly suspended from said hopper to embrace opposite side wall portions of the hopper, said boot having a discharge opening in the lower portion thereof, trough sections disposed below and spaced from the bottom wall of said hopper and each having an inclined bottom surface arcuate in cross-section and upward extending side-walls adapted to embrace opposite side-wall portion of said hopper, hangers pivoted to said hopper and said trough-sections and suspending said sections respectively on opposite sides of said boot with their bottom surface declining toward said boot and extending into said boot, a vibratory camming means on each end of said shaft exteriorly of said hopper and including a cam follower mounted to produce a reciprocating movement and a jolting vibrating action, a linkage connecting said cam followers with their adjacent trough section, and means holding said followers in contact with their cam means, whereby a longitudinal shaking motion is imparted to said trough sections and a vibrating action is imparted through said shaft to said feeding blade means.

6. A distributor for fertilizer or the like, a hopper having an elongated sump portion at its bottom wall, said sump having a series of discharge openings along its length, means for regulating the discharge from said openings, a rotatable shaft in said hopper and extending longitudinally of said sump and spaced therefrom, blade means along and fast to said shaft and extending into said sump, trough-like conveying means disposed below and spaced from said sump portion of said hopper, and a mechanism operatively associated with and actuated from said shaft and connected with said conveying means to impart a rapid shaking motion to said conveying means and a vibrating motion to said blades.

7. A distributor for fertilizer or the like, a hopper having an elongated sump portion at its bottom wall, said sump having a series of discharge openings along its length, means for regulating the discharge from said openings, a rotatable shaft in said hopper and extending longitudinally of said sump and spaced therefrom, blade means along and fast to said shaft and extending into said sump, trough-like conveying means disposed below and spaced from said sump portion of said hopper, a disc fast on an end of said shaft and wedge-cam surfaces on a face of said disc, a cam-follower operatively mounted in cooperative relation with said cam-surfaces, a linkage connecting said cam-follower with said trough means, and biasing means normally holding said follower in contact with said disc, whereby a rapid shaking motion is imparted to said trough means and repeated vibratory motion to said blades.

8. In a distributor for fertilizer and the like, an elongated hopper having converging side walls merging into an arcuate bottom wall having a longitudinally disposed series of openings therein, means controlling the passage of the contents of the hopper through said openings, a rotatable shaft extending through said hopper and substantially parallel with and spaced from its bottom wall, blades spaced along and fast to said shaft within said hopper and each blade comprising oppositely extending radial portions having a lateral projection at their ends extending, respectively, in opposite direction substantially parallel with said shaft, a collecting boot disposed below and in spaced relation with a central portion of said bottom wall of said hopper and fixedly suspended from said hopper to embrace opposite side wall portions of the hopper, said boot having a discharge opening in the lower portion thereof, trough sections disposed below and spaced from the bottom wall of said hopper and each having an inclined bottom surface arcuate in cross-section and upwardly extending side-walls adapted to embrace opposite side-wall portions of said hopper, link-hangers pivoted to said hopper and said trough-sections and suspending said sections respectively on opposite sides of said boot with their bottom surfaces declining toward said boot and their inner ends extending into said boot, a disc fast on each end of said shaft exteriorly of said hopper and wedge-cam surfaces diametrically positioned thereon, the cam surfaces on one disc being angularly spaced with respect to the cam-surfaces on the other disc, a cam follower for each disc and swingably mounted on said hopper in cooperative relation to said cam-surfaces, a linkage connecting said cam followers with their adjacent trough section, and biasing means normally holding said followers in contact with said discs and causing said trough sections to move toward each other.

9. The combination, with a self-propelled tractor including a prime-mover and a propelling change-speed transmission mechanism disposed between said prime-mover and the running gear of the tractor, of a pair of hoppers removably supported in spaced relation on each side of the rear portion of said tractor and having dispensing openings in their bottom walls thereof to dispense their contents in granular form and in a plurality of streams therefrom, a shaft extending through said hoppers transversely of said tractor and having lump-breaking and feed means thereon within each hopper, a sprocket wheel fast on said shaft at a point between said hoppers, a drive connection between the output side of said change-speed transmission means and said spricket, inclined trough-like means underlying each hopper to receive the streams of material dispensed therefrom and swingably supported in said position, a cam-mechanism on said shaft and connected to an adjacent trough means to impart a rapid shaking motion thereto longitudinally thereof and a vibratory motion to said means, and a chute means cooperatively positioned with respect to the lower end of the trough means of each hopper, respectively, to collect therefrom and direct the material dispensed from its associated hopper in a stream behind and on its adjacent side of the tractor.

10. The combination set-forth in claim 9 wherein there is a common control means to regulate the feed of material from said hoppers, and wherein a clutch unit is interposed in the drive connection to said shaft and is normally biased to establish said drive, when the tractor is in forward movement, and disconnecting said drive automatically, when movement of the tractor is rearwardly.

11. The combination, with an ambulatory distributor device having an operable means discharging a solid material therefrom in a series of fluent streams and means adapted to connect said operable means to a source of power, of a device to deliver said discharged material to a furrow as said distributor device progresses in its travel and comprising movably mounted trough members underlying the discharge means to receive said material from said discharge means and having their bottoms declining from opposite portions, respectively, of said distributor device to an intermediate point of discharge thereunder, and shaker means operatively connected to said trough members and to said operable discharge means and actuated from the latter to impart a reciprocating shaking movement to the trough members longitudinally thereof and including means to impart a vibratory motion to said discharging means.

12. In a distributor of the type described, a vehicle having a running-gear, a hopper having elongated sump portion provided with discharge openings therein along its length, means within said hopper positioned to feed its contents through said openings and including a rotatable shaft to actuate said means, a drive connection between said running-gear of the vehicle and said shaft effectively operable in the forward movement only of the vehicle, trough means underlying said sump portion of the hopper to receive the material dispensed therefrom and mounted to have a reciprocable movement longitudinally thereof and to discharge said material from an end thereof, a motion converter means operatively connected between said shaft and said trough means to impart a reciprocating shaking motion to said means and a vibrating motion to said feeding means, when said shaft is rotated, and a chute mounted at the discharge end of the trough means to receive all the material collected and conveyed by said means, whereby said material may be delivered by said chute in a ribbon-like flow to a furrow or the like.

13. In a fertilizer distributor of the type described, a self-propelled vehicle having a prime-mover thereon, a change-speed power transmission mechanism between the running-gear of the vehicle and said prime mover, a container mounted on said vehicle, a metering device positioned to feed the contents of the container therefrom including a rotary part, a drive connection between said rotary part and the output side of said transmission mechanism for rotating said part, whereby the rate of metered material is proportional with respect to the rate of speed of travel of the vehicle, means positioned to collect the material metered from said container and to convey the same in a ribbon-like flow to a point of discharge, and a motion converter means operatively connected between said rotary part and said collecting means to impart a reciprocating shaking motion to said trough means and to vibratory action to said metering means when said shaft is rotated.

References Cited in the file of this patent
UNITED STATES PATENTS

| | | |
|---|---|---|
| 9,006 | Sanders | June 8, 1852 |
| 31,819 | Moore | Mar. 26, 1861 |
| 143,832 | Montfort | Oct. 21, 1873 |
| 350,164 | Spangler | Oct. 5, 1886 |
| 374,653 | Brock | Dec. 13, 1887 |
| 411,005 | Birmingham | Sept. 17, 1889 |
| 746,676 | Coffee | Dec. 15, 1903 |
| 1,059,206 | Porcher | Apr. 15, 1913 |
| 1,742,350 | Hatch | Jan. 7, 1930 |
| 1,868,588 | Romera | July 26, 1932 |
| 2,066,953 | Urquhart | Jan. 5, 1937 |
| 2,221,769 | Hipple | Nov. 19, 1940 |
| 2,290,712 | Robinson | July 21, 1942 |
| 2,363,292 | Brown | Nov. 21, 1944 |
| 2,410,918 | Acton | Nov. 12, 1946 |
| 2,429,841 | Phillips | Oct. 28, 1947 |
| 2,510,231 | Juzwiak | June 6, 1950 |
| 2,541,008 | Stahmer et al. | Feb. 6, 1951 |

FOREIGN PATENTS

| | | |
|---|---|---|
| 2,446 | Great Britain | 1879 |